United States Patent
Wang et al.

(10) Patent No.: US 9,357,274 B2
(45) Date of Patent: May 31, 2016

(54) SYSTEM AND METHOD FOR STORING MULTI-SOURCE MULTIMEDIA PRESENTATIONS

(75) Inventors: Ye Kui Wang, Bridgewater, NJ (US); Miska Hannuksela, Ruutana (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 12/575,798

(22) Filed: Oct. 8, 2009

(65) Prior Publication Data

US 2010/0199183 A1    Aug. 5, 2010

Related U.S. Application Data

(60) Provisional application No. 61/103,897, filed on Oct. 8, 2008.

(51) Int. Cl.
*G06F 3/0481* (2013.01)
*H04N 21/8352* (2011.01)
(Continued)

(52) U.S. Cl.
CPC ..... *H04N 21/8352* (2013.01); *H04N 21/41407* (2013.01); *H04N 21/4307* (2013.01); *H04N 21/4325* (2013.01); *H04N 21/4331* (2013.01); *H04N 21/4438* (2013.01); *H04N 21/4622* (2013.01); *H04N 21/4788* (2013.01); *H04N 21/8543* (2013.01); *H04N 21/85406* (2013.01)

(58) Field of Classification Search
CPC .................................. G06F 17/00; G06F 3/01
USPC ................................. 715/733, 751, 753, 759
See application file for complete search history.

(56) References Cited

U.S. PATENT DOCUMENTS

| 5,915,091 A | 6/1999 | Ludwig et al. |
| 6,119,147 A | 9/2000 | Toomey et al. |

(Continued)

FOREIGN PATENT DOCUMENTS

| CN | 1874505 A1 | 12/2006 |
| KR | 2008-0033794 A | 4/2008 |

(Continued)

OTHER PUBLICATIONS

International Search Report and Written Opinion from International Application No. PCT/FI2009/050795, mailed Dec. 18, 2009.
(Continued)

*Primary Examiner* — Rashawn Tillery
(74) *Attorney, Agent, or Firm* — Alston & Bird LLP

(57) ABSTRACT

A file format design supports storage of multi-source multimedia presentations via the inclusion of indications as to whether a presentation is a multi-source presentation, and for one media type, the tracks of which are from different sources and should be played simultaneously. If a multi-source presentation exists, additional indications may be provided including: an indication of a multi-source presentation type being stored; indications regarding the source of each track and which tracks have the same source; indications of different parties' information such as phone numbers, etc. Thus, a player may play back a recorded presentation in the same or substantially the same manner as it was presented during the actual session, and may automatically manipulate the presentation to be more informative or efficient. The file format design further supports storage of other types of multi-source presentations that render more than one media stream for at least one type of media.

20 Claims, 5 Drawing Sheets

(51) Int. Cl.
*H04N 21/414* (2011.01)
*H04N 21/43* (2011.01)
*H04N 21/432* (2011.01)
*H04N 21/433* (2011.01)
*H04N 21/443* (2011.01)
*H04N 21/462* (2011.01)
*H04N 21/4788* (2011.01)
*H04N 21/854* (2011.01)
*H04N 21/8543* (2011.01)

(56) References Cited

U.S. PATENT DOCUMENTS

| | | | |
|---|---|---|---|
| 6,426,778 | B1 | 7/2002 | Valdez, Jr. |
| 6,639,606 | B1* | 10/2003 | Choi ............................. 715/700 |
| 7,099,798 | B2* | 8/2006 | Yu et al. ........................ 702/186 |
| 7,103,667 | B1 | 9/2006 | Bell et al. |
| 7,373,379 | B2 | 5/2008 | Comstock et al. |
| 7,761,505 | B2* | 7/2010 | Krzyzanowski et al. ..... 709/204 |
| 2003/0020803 | A1* | 1/2003 | Yang et al. .................. 348/14.01 |
| 2003/0163781 | A1* | 8/2003 | Visharam et al. ............. 715/500 |
| 2004/0230655 | A1* | 11/2004 | Li et al. ......................... 709/205 |
| 2005/0210105 | A1* | 9/2005 | Hirata et al. .................. 709/205 |
| 2006/0047674 | A1 | 3/2006 | Visharam et al. |
| 2007/0133437 | A1 | 6/2007 | Wengrovitz et al. |
| 2007/0165105 | A1* | 7/2007 | Lengeling et al. ......... 348/14.08 |
| 2008/0052306 | A1* | 2/2008 | Wang et al. ................... 707/101 |
| 2008/0263010 | A1* | 10/2008 | Roychoudhuri et al. ......... 707/3 |

FOREIGN PATENT DOCUMENTS

| | | |
|---|---|---|
| WO | WO 2008/091136 A1 | 7/2008 |
| WO | WO 2008/148930 A1 | 12/2008 |

OTHER PUBLICATIONS

Supplementary European Search Report for Application No. EP 09 81 8848 dated Jul. 20, 2012.

Office Action for Russian Application No. 2011117609/08(026136) dated Jul. 13, 2012.

Office Action for Korean Application No. 2011-7010553 dated Sep. 11, 2012.

Overview of the MPEG-4 Standard, IST/IEC JTCI/SC29/WG11 N3931, Jan. 2001, 67 pages.

Perkis, A. et al., *MPEG-21 Requirements Input Based on Media Resource Delivery*, MPEG Meeting; Mar. 12, 2001-Jul. 12, 2011; Pattaya; Motion Picture Expert Group or ISO-IEC JTCI/SC29/WG11), No. M7644, Nov. 22, 2001.

Office Action for Chinese Application No. 200980149283.3; dated Jul. 25, 2013.

Office Action for Canadian Application No. 6,740,119 dated Jul. 5, 2012.

Office Action for European Application No. 09 818 848.5 dated Apr. 9, 2014.

Office Action for Chinese Application No. 200980149283.3 dated Apr. 15, 2014.

\* cited by examiner

SYSTEM AND METHOD FOR STORING MULTI-SOURCE MULTIMEDIA PRESENTATIONS

CROSS-REFERENCE TO RELATED APPLICATIONS

The present application claims priority to U.S. Provisional Patent Application No. 61/103, 897, filed Oct. 8, 2008.

FIELD OF THE INVENTION

Various embodiments relate generally to the storage of multimedia presentations. More particularly, various embodiments relate to the storage of multi-source multimedia presentations in files for local playback or transmission, where multi-source multimedia presentations refer to those multimedia presentations that render more than one media stream for at least one type of media.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The file format is an important element in the chain of multimedia content production, manipulation, transmission and consumption. There is a difference between the coding format and the file format. The coding format relates to the action of a specific coding algorithm that codes the content information into a bitstream. In contrast, the file format comprises a mechanism for organizing the generated bitstream in such way that it can be accessed for local decoding and playback, transferred as a file, or streamed, all utilizing a variety of storage and transport architectures. Additionally, the file format can be used to facilitate the interchange and editing of the media. For example, many streaming applications require a pre-encoded bitstream on a server to be accompanied by metadata (stored in "hint-tracks") that assists the server in streaming the video to the client. A hint track does not contain media data, but instead contains instructions for packaging one or more tracks into a streaming channel.

Available media file format standards include the International Organization for Standardization (ISO) base media file format (ISO/International Electrotechnical Commission (IEC) 14496-12) (also referred to as the ISO file format in short), the Moving Picture Experts Group (MPEG)-4 file format (ISO/IEC 14496-14), the Advanced Video Coding (AVC) file format (ISO/IEC 14496-15) and the $3^{rd}$ Generation Partnership Project (3GPP) file format (3GPP TS 26.244). Efforts are also underway in MPEG for the development of the Scalable Video Coding (SVC) file format and the Multiview Video Coding (MVC) file format, which are expected to become two amendments to the AVC file format.

The ISO file format is the basis for derivation of all the above-identified file formats (excluding the ISO file format itself). These file formats (including the ISO file format itself) are referred to as the ISO family of file formats. According to the ISO family of file formats, each file contains exactly one movie box corresponding to one presentation. The movie box may contain one or more tracks, and each track resides in one track box. For the presentation of one media type (e.g., audio or video), one track is typically selected, though it is possible for there to be more than one track storing information of a certain media type. A subset of these tracks may form an alternate track group, where each track is independently decodable and can be selected for playback.

In multiparty conferencing, receivers typically display videos from a selected subset of participants in split-screen windows, e.g. an arrangement is illustrated in FIG. 6. A multipoint control unit (MCU) may transcode the incoming video streams of the selected subset of participants to one video stream, which contains all the video contents from the selected subset of participants. Alternatively, the MCU can simply forward the incoming video streams of the selected subset of participants to the receivers, after which each video stream is decoded individually.

Receivers may want to store multiparty conferencing presentations for future use. However, the current standard file format designs do not support the storage of presentations of multiparty video conferences, if the MCU forwards streams to participants. A receiver may store the video streams to be displayed in separate video tracks according to existing file format designs, e.g., the ISO base media file format. However, in that case, a player that takes the file as input has no way of knowing which video tracks should be decoded and how to display the respective video tracks.

In a variety of other application scenarios, other types of multi-source multimedia presentations that render more than one media stream for at least one type of media are possible. Examples of such other application scenarios include, e.g.: recorded video telephony, where there are two participants, the caller and the answerer; video surveillance, where there may be a large number of cameras (possibly equipped with audio sensors), that would send audio-visual signals to a control center; and recorded training-like presentations, where presentation slides and one or more talker(s) may be recorded in separate media streams and later both displayed.

Additionally, it would be useful to easily know from a file, what application scenario the multi-source presentation was or is for, thus providing a context for when the file is used in the future. Furthermore, it would be useful to know from a file more context information, e.g., participant names, telephone numbers, and who made a recording for video telephony/conferencing, or camera identifiers and/or position descriptions for video surveillance. Further still and with regard to video surveillance, it is possible for multiple audio sources to exist, each of which is associated with one video source. However, a mechanism that maps an audio source (stored in one audio track) to a video source (stored in a video track) has not been provided in conventional systems and methods.

Moreover, in application scenarios such as video telephony, conferencing, and surveillance, it is typically useful to display the active party or source in a more conspicuous manner than other parties/sources. Therefore, if information regarding an active party or source (either auditory and/or visually) were available in a file, future players of the file may automatically easily display the active party or source according to such information. Lastly and as to any auditory and/or visual presentation, silent periods where neither the auditory nor the visual scene is active are the least informative. Therefore, particularly for browsing-like purposes, it would be useful to suppress the playing time of such silent periods. Thus, having information indicative of silent periods would be helpful.

SUMMARY OF THE INVENTION

Various embodiments provide a file format design that supports the storage of multi-source multimedia presentations. This support is enabled via the inclusion of indications as to whether a presentation is a multi-source presentation, and for one media type, the tracks of which are from different sources and should be played simultaneously. If the presentation is a multi-source presentation, additional indications may be provided including, but not limited to the following: an indication of the type of multi-source presentation being stored; indications regarding the source of each track and which tracks are from the same source; indications indicative of different parties' information such as phone numbers, participant names, camera identifiers, position descriptions, etc.; indications of how to display the decoded video streams in a split-screen window; as well as indications of the auditory or visual activity level.

With such an arrangement, a player is capable of playing back a recorded video telephony presentation, a recorded multiparty video conferencing presentation, a recorded video surveillance presentation, or a recorded training-like presentation in the same or substantially the same manner as it was presented during the actual session. Additionally, the presentation may be automatically manipulated by the player to make the presentation more informative or more efficient. The file format design in accordance with various embodiments also supports the storage of other types of multi-source presentations that render more than one media stream for at least one type of media.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of various embodiments are described by referring to the attached drawings, in which.

DETAILED DESCRIPTION OF THE PREFERRED EMBODIMENTS

Figure 1:
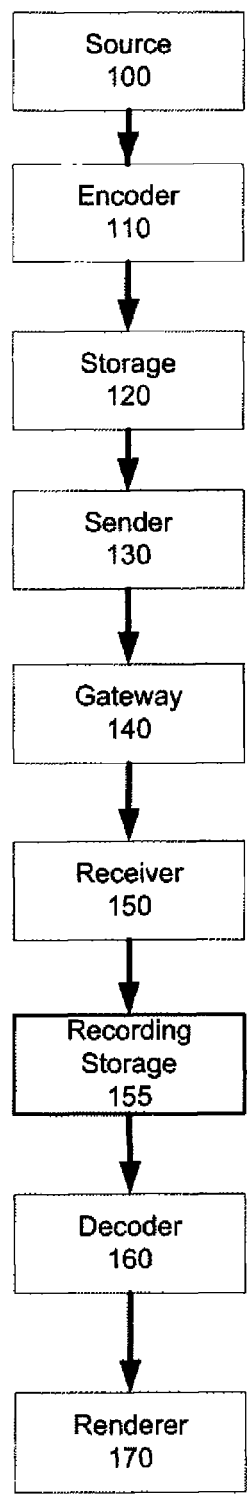
FIG. 1 is a representation of a generic multimedia communications system for use with various embodiments of the present invention.

Various embodiments include a file format design that supports the storage of multi-source multimedia presentations that is enabled via the inclusion of indications as to whether a presentation is a multi-source presentation, and for one media type, the tracks of which are from different sources and should be played simultaneously. If the presentation is a multi-source presentation, additional indications may be provided. Such additional indications/signifiers can include, but are not limited to the following indications: an indication of the type of multi-source presentation being stored; indications regarding the source of each track and which tracks are from the same source; indications indicative of different parties' information such as phone numbers, participant names, camera identifiers, position descriptions, etc.; indications of how to display the decoded video streams in a split-screen window; as well as indications of the auditory or visual activity level. Hence, a player may play back, e.g., a recorded video telephony presentation, a recorded multiparty video conferencing presentation, a recorded video surveillance presentation, or a recorded training-like presentation in the same or substantially the same manner as it was presented during the actual session. Additionally, the presentation may be automatically manipulated by the player to make the presentation more informative or more efficient. The file format design in accordance with various embodiments also supports the storage of other types of multi-source presentations that render more than one media stream for at least one type of media.

In one embodiment, a conventional MovieHeaderBox is changed as follows, such that some of the reserved bits are, e.g., used as signifiers to indicate whether a presentation contained in the file is a multi-source presentation, and if so, the type of the multi-source presentation:

```
aligned(8) class MovieHeaderBox extends FullBox('mvhd', version, 0) {
    if (version==1) {
        unsigned int(64)    creation_time;
        unsigned int(64)    modification_time;
        unsigned int(32)    timescale;
        unsigned int(64)    duration;
    } else { // version==0
        unsigned int(32)    creation_time;
        unsigned int(32)    modification_time;
        unsigned int(32)    timescale;
        unsigned int(32)    duration;
    }
    template int(32)    rate = 0x00010000;    // typically 1.0
    template int(16)    volume = 0x0100;      // typically, full volume
    unsigned int(8)     multisource_presentation;
    const bit(8)        reserved = 0;
    const unsigned int(32)[2]   reserved = 0;
    template int(32)[9]    matrix =
        { 0x00010000,0,0,0,0x00010000,0,0,0,0x40000000 };
        // Unity matrix
    bit(32)[6]    pre_defined = 0;
    unsigned int(32)    next_track_ID;
}
```

A "multisource_presentation" value equal to 0 specifies that the presentation stored in this file is not a multi-source presentation, and a "multisource_presentation" value not equal to 0 specifies that the presentation stored in this file is a multi-source presentation. The value specified identifies the multi-source presentation type. For example, a multisource_presentation value of 1 may specify a video telephony presentation, a multisource_presentation value of 2 may specify a video conferencing presentation, a multisource_presentation value of 3 may specify a video surveillance presentation, a multisource_presentation value of 4 may specify training-like presentations, and so on. It should be noted that other types of multi-source presentations may be indicated/signified in accordance with various embodiments, and that the indicators/signifiers can be configured as desired, to be representative of the various types of multi-source presentations.

As indicated above and in accordance with this embodiment, when a "multisource_presentation" value is not equal to 0, it is known that all of the tracks belong to a multi-source presentation. In the event that a number of tracks form an alternate track group, only one of them is selected for playback.

Furthermore, a new box is defined and contained in the movie box for the file when the value of the "multisource_presentation" is not equal to 0. This new box, referred to as the Multisource Track Grouping Box, is defined as follows:
Box Type: 'mstg'
Container: Movie Box ('moov')
Mandatory: No
Quantity: Zero or One This box specifies the grouping of tracks for a multi-source presentation. An exemplary syntax for use in implementing this embodiment is as follows:

```
aligned(8) class MultisourceTrackGroupingBox extends FullBox('mstg',
version = 0, flags = 0)
{
    int i,j,k;
    unsigned int(8) num_media_types;
    for(i=0; i<num_media_types; i++) {
        unsigned int(32) media_type_name;
        unsigned int(16) num_media_sources;
        for(j=0; j<num_media_sources; j++) {
            unsigned int(16) media_source_id;
            string source_info;
            unsigned int(8) num_alternate_tracks;
            for(k=0; k<num_alternate_tracks; k++)
                unsigned int(32) alternate_track_id;
        }
    }
}
```

Relevant semantics for the syntax delineated above is as follows. "version" refers to an integer that specifies the version of this box (equal to 0 in this instance). "flags" is a 24-bit integer with flags (equal to 0 in this instance). "num_media_types" specifies the number of media types involved in the multi-source presentation. For example, if there are only audio and video involved in the presentation, the value of "num_media_types" is equal to 2. "media_type_name" specifies the name of the current media type (associated with the value of i), which may be the same as that defined by "handler_type" integer in the Handler Reference Box. For example, 'vide' specifies a video media type, and 'soun' specifies an audio media type.

"num_media_sources" specifies the number of sources for the current media type (associated with the value of i). "media_source_id" specifies the identifier of the current media source (associated with the value of j) for the current media type (associated with the value of i). It should be noted that the source identifier may be any type of an identifier besides a 16-bit unsigned integer, e.g., a Universal Unique Identifier (UUID), a Uniform Resource Locator (URL), an Internet Protocol (IP) address, a Medium Access Control (MAC) address, a location & orientation, or any combination thereof. "source_info" is a null-terminated string in UTF-8 characters which gives human-readable information regarding the source. For example, when the value of "multisource_presentation" (in the MovieHeaderBox) is 1 (video telephony) or 2 (video conferencing), the participant name, phone number, and or other relevant information regarding this source is included in "source_info". When the value of "multisource_presentation" is 3 (video surveillance), the camera identifier and position description for this source is included in the "source_info" string. "num_alternate_tracks" specifies the number of alternate tracks for the current media source (associated with the value of j) for the current media type (associated with the value of i). "alternate_track_id" specifies the track identifier of the current alternate track (associated with the value of k) for the current media source (associated with the value of j) for the current media type (associated with the value of i). For one media source of one media type, only one of the alternate tracks is selected to be decoded and rendered.

Different media types can be mapped by the same value of media source identifier specified by "media_source_id". For example, in a video surveillance presentation, an audio track and a video track having the same media source identifier are considered to be from the same source (i.e., the same location is monitored by a sensor that has captured both audio and video signals).

Various embodiments also involve providing the same indications (as described above) locally to each track, instead of globally in association with the MovieHeaderBox and the MultisourceTrackGroupingBox. In one embodiment, certain new track reference types are defined, each corresponding to one multi-source presentation type. For example, the reference types 'tlfn', 'conf', 'surv' and 'pres' are defined, for video telephony, video conferencing, video surveillance, and training-like presentations, respectively. According to this embodiment, for each media type, each track that belongs to a multi-source presentation contains a TrackReferenceTypeBox of one of the above four types (i.e., with reference_type equal to one of the above four types). The track_ID of each track belonging to the same multi-source conference presentation is equal to one of the track_IDs present in the TrackReferenceTypeBox of one of the above four types. With this embodiment, a file reader can obtain information regarding which tracks belong to a multi-source presentation by checking all the tracks. In the event that more than one track containing a TrackReferenceTypeBox of one of the above four types form an alternate track group, then only one of them is selected for playback. Alternatively, instead of having one track reference for each type of multi-source presentation, only one new track reference of type 'msrc' is defined for all multi-source presentation types, such that for each of the other tracks of the same source, the track_ID is included in the TrackReferenceTypeBox of type 'msrc'. In this case, the type of the presentation can be included elsewhere, e.g. in a track level box.

For mapping of the source of an audio track and a video track, a source identifier is included in each track, either in a new box or in a track-level box, e.g., the media information box or the track header box. The source identifier may be any type of an identifier, e.g. unsigned integer, Universal Unique Identifier (UUID), Uniform Resource Locator (URL), Internet Protocol (IP) address, Medium Access Control (MAC) address, location & orientation, or any combination thereof. When a new box is used to contain the source identifier, the new box itself can be contained in a track-level box, e.g., the media information box or the track header box. In this case, the presence of such a new box that contains the source identifier can be used as an indication that the track belongs to a multi-source presentation. For a certain media type, e.g., video, the player can choose one track for each value of source identifier, and play all these tracks from difference sources simultaneously. The participants' names and phone numbers or camera identifiers and position descriptions, etc. may also be included in the same box.

Various embodiments also involve providing indications as to how the decoded video streams should be displayed in a split-screen. In accordance with one particular embodiment, a new sample grouping of type 'sswp' is defined to specify the split-screen window position where each sample of a track should be displayed. In this arrangement, each video track that belongs to a multi-source presentation includes a SampleToGroupBox with grouping_type equal to 'sswp' and a SampleGroupDescriptionBox with grouping_type equal to 'sswp'. The SampleToGroupBox maps each sample to a split-screen window position sample group, and each sample group typically contains multiple samples. For each split-screen window position sample group, a SswpSampleGroupEntry as defined below is included in the SampleGroupDescriptionBox to document the position in the split-screen window where each sample of the corresponding sample group should be displayed:

```
aligned(8) class SswpSampleGroupEntry( )extends
VisualSampleGroupEntry('sswp') {
    unsigned int(8) sswp_x;
    unsigned int(8) sswp_y;
    unsigned int(8) sswp_w;
    unsigned int(8) sswp_h;
}
```

The entire area of one video source, represented by samples of the corresponding sample group, can be displayed over multiple split-screen windows or one split-screen window. The whole screen is divided into a number of split-screen windows and a split-screen window shall either contain no video source or have its full area occupied by just one video source. In the above definition, 'sswp_x' specifies the horizontal coordinate of the split-screen window where the top-left area represented by the samples of the corresponding sample group should be displayed. In this embodiment, the top-left split-screen window has a 'sswp_x' equal to 0. 'sswp_y' specifies the vertical coordinate of the split-screen window where the top-left area represented by the samples of the corresponding sample group should be displayed. In this embodiment, the top-left split-screen window has a sswp_y equal to 0. 'sswp_w' specifies the width of the display area wherein samples of the corresponding sample group should be displayed. The unit is the width of a split-screen window. 'sswp_h' specifies the height of the display area wherein samples of the corresponding sample group should be displayed. The unit is the height of a split-screen window. Displaying of the samples covers the split-screen windows with horizontal coordinate in the scope of sswp_x to (sswp_x+sswp_w-1), inclusive, and vertical coordinate in the scope of sswp_y to (sswp_y+sswp_h-1), inclusive. When both sswp_w and sswp_h are equal to 1, the samples are displayed exactly in one split-screen window which has coordinates (sswp_x, sswp_y).

In yet another embodiment, a new box is included in each track to signal the same display information as above for each segment of decoding time or composition (i.e., display) time.

In accordance with various embodiments described above, if at some time period the decoded video of only one source is displayed, the videos of other sources were not transmitted during the real session. Consequently, for that time period, those invisible tracks would have edit lists, and the player can know based upon these lists which track it should display, preferably scaled into the entire screen in one embodiment.

Various embodiments also involve providing indications as to whether a party or participant is active. In one embodiment, a new sample grouping of type 'actv' is defined to specify whether the party or participant, at the time of each sample in the track, is active or not. In this arrangement, each track that belongs to a multi-source presentation includes a SampleToGroupBox with a grouping_type equal to 'actv'. The SampleToGroupBox maps each sample to an active or inactive sample group, and each sample group typically contains multiple samples. For each sample group of type 'actv', an ActiveSampleGroupEntry as defined below is included in the SampleGroupDescriptionBox to document whether the samples in the corresponding sample group are active or inactive:

```
aligned(8) class ActiveSampleGroupEntry( ) extends
VisualSampleGroupEntry('actv') {
    unsigned int(8) sample_active;
}
```

A sample_active equal to 0 specifies that the samples of the corresponding sample group are inactive, whereas a sample_active equal to 1 specifies that the samples of the corresponding sample group are active. In another embodiment, the value of sample_active specifies the relative active level of the samples of the corresponding sample group, where a 0 value indicates completely inactive samples, and a value of 255 indicates the maximum level of activity. Any higher value of sample_active can be used to indicate a higher level of activity. In yet another embodiment, this information is signaled in a new global box, e.g., a global box contained in the Movie Box. With these embodiments, the player of the file can automatically determine which participant(s) in a video telephony or conferencing session are talking, and select the video of that participant(s) to be displayed in a larger size, in full-window, in full-screen, etc. When quickly browsing a video surveillance presentation, the player can also avoid the playback of inactive periods.

In yet another embodiment, a new box is defined to be contained in each track box. This new box contains a loop, for which the number of entries is equal to the number of samples in the track. Each entry of the loop contains an 8-bit sample_active field, with semantics similar to that described above. In yet another embodiment, a timed metadata track is included in the file for each media track. Samples of a timed metadata track are time-aligned with samples of the corresponding media track. Additionally, the activity of each media sample can be indicated by an 8-bit sample_active field in the corresponding timed metadata sample, the semantics of sample_active again being similar to that described above.

It should be noted that in accordance with various embodiments, the arrangements, definitions, indications, etc. described in conjunction with all of the previously described embodiments can be applied to hint tracks, each corresponding to a media track (e.g. an audio track or a video track).

FIG. 1 is a graphical representation of a generic multimedia communication system within which various embodiments of the present invention may be implemented. As shown in FIG. 1, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 1 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are many coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in the figure) is used to decapsulate each coded media bitstream from the container file. The recording storage 155 or a decoder 160 may comprise the file parser, or the file parser is attached to either recording storage 155 or the decoder 160.

The codec media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

Figure 2:
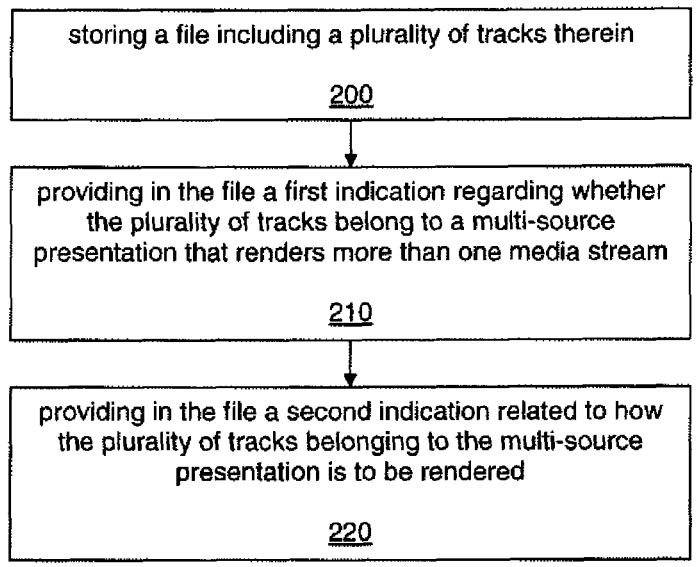
FIG. 2 is a flow chart illustrating exemplary processes performed in an encoding procedure in accordance with various embodiments.

FIG. 2 is a flow chart illustrating exemplary processes performed in a file composing procedure in accordance with various embodiments. It should be noted that more or less processes may be performed in accordance with various embodiments. At 200, a file including a plurality of tracks therein is stored. At 210, at least one first indication regarding whether the plurality of tracks belong to a multi-source presentation that renders more than one media stream for at least one type of media is provided in the file. At 220, a second indication related to how the plurality of tracks belonging to the multi-source presentation is to be rendered is provided in the file.

Figure 3:
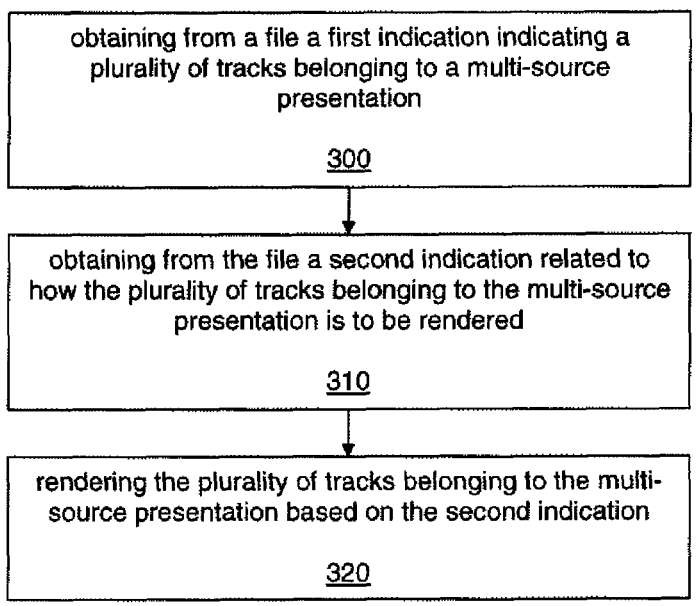
FIG. 3 is a flow chart illustrating exemplary processes performed in a decoding procedure in accordance with various embodiments.

FIG. 3 is a flow chart illustrating exemplary processes performed in a file parsing procedure in accordance with various embodiments. It should be noted that more or less processes may be performed in accordance with various embodiments. At 300, a plurality of tracks are identified via at least one first identification, within a file as belonging to a multi-source presentation from which more than one media stream is to be rendered for at least one type of media. At 310, a second indication related to how the plurality of tracks belonging to the multi-source presentation is to be rendered is retrieved from the file. At 320, each track identified as belonging to the multi-source presentation is rendered.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 4:
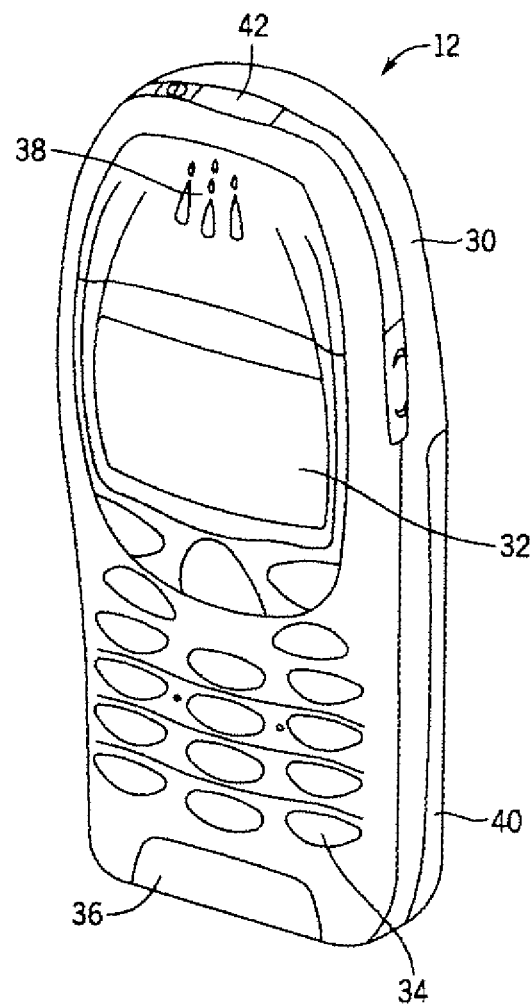
FIG. 4 is a perspective view of an electronic device that can be used in conjunction with the implementation of various embodiments of the present invention.
Figure 5:
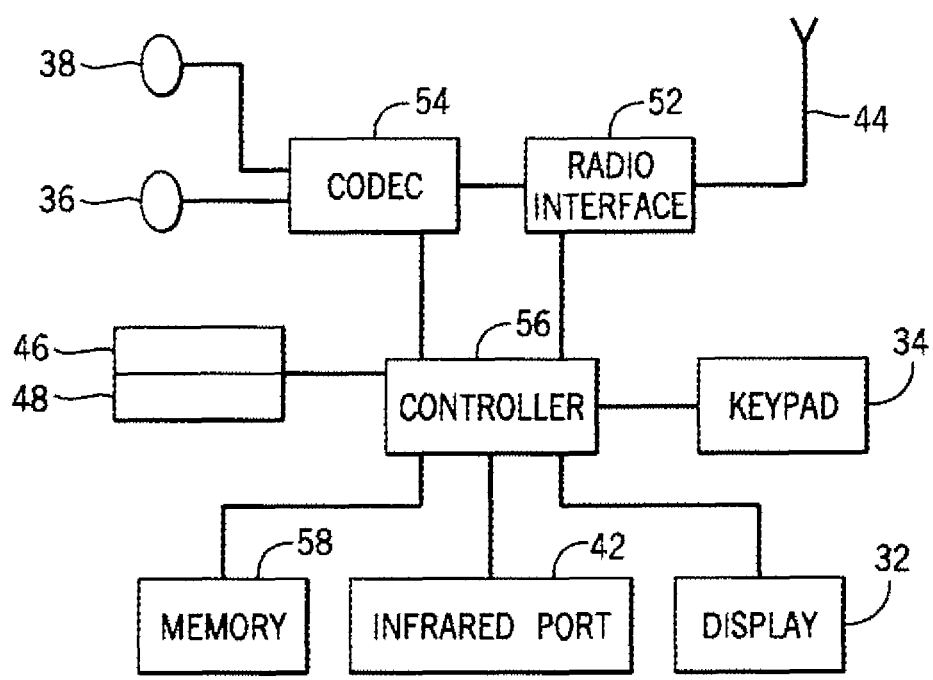
FIG. 5 is a schematic representation of the circuitry which may be included in the electronic device of FIG. 4.
Figure 6:
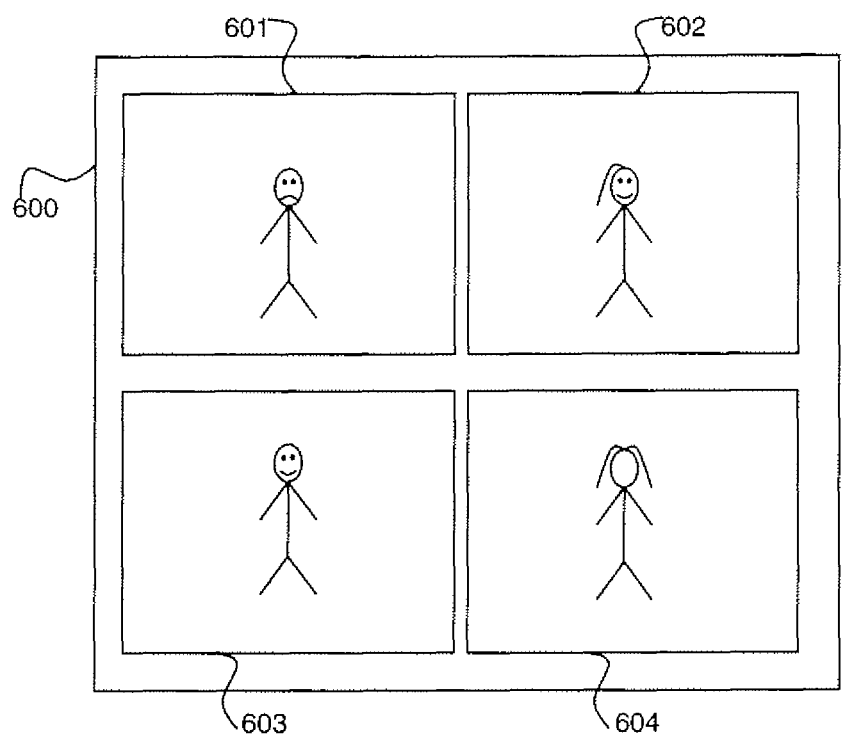
FIG. 6 is a schematic representation of an arrangement of multi-picture display

FIGS. 4 and 5 show one representative electronic device 12 within which various embodiments may be implemented. It should be understood, however, that various embodiments are not intended to be limited to one particular type of device. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit various embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize various embodiments and with various modifications as are suited to the particular use contemplated. The features of the embodiments described herein may be combined in all possible combinations of methods, apparatus, modules, systems, and computer program products.

What is claimed is:

1. A method, comprising:
    causing a file including a plurality of tracks therein to be stored;
    causing a first indication to be provided in the file regarding whether the plurality of tracks belong to a multi-source presentation that renders more than one media stream;
    causing a second indication to be provided in the file related to how the plurality of tracks belonging to the multi-source presentation is to be rendered; and
    causing one or more activity indicators to be provided in the file, each activity indicator indicating an activity level of a sample of one of the plurality of tracks;
    wherein one or more of the plurality of tracks comprise video streams and further wherein the second indication comprises an indication of at least one split-screen window position specifying where to display the one or more video streams in a split-screen view, the at least one split-screen window position specifying horizontal and vertical coordinates of at least one split-screen window displaying the one or more video stream.

2. The method of claim 1, wherein the multi-source presentation comprises at least one of a video telephony presentation, a multiparty video conferencing presentation, a video surveillance presentation, and a training-like presentation.

3. The method of claim 1, wherein the first indication comprises a signifier in a movie box for the file indicating at least one of sources and source information, and source-based mapping of media tracks in the file.

4. The method of claim 1, wherein the first indication comprises a source identifier in a track, and wherein the source identifier is indicative of a source from where media contained in the track was originated.

5. A computer-readable non-transitory storage medium having computer program code portions stored thereon, the computer program code portions being configured to, upon execution, cause an apparatus to perform the method of claim 1.

6. An apparatus comprising a processor and a memory storing program code, the memory and program code being configured to, with the processor, direct the apparatus to at least:
    cause a file including a plurality of tracks therein to be stored;
    cause a first indication to be provided in the file regarding whether the plurality of tracks belong to a multi-source presentation that renders more than one media stream;
    cause a second indication to be provided in the file related to how the plurality of tracks belonging to the multi-source presentation is to be rendered; and
    cause one or more activity indicators to be provided in the file, each activity indicator indicating an activity level of a sample of one of the plurality of tracks;
    wherein one or more of the plurality of tracks comprise video streams and further wherein the second indication comprises an indication of at least one split-screen window position specifying where to display the one or more video streams in a split-screen view, the at least one split-screen window position specifying horizontal and vertical coordinates of at least one split-screen window displaying the one or more video stream.

7. The apparatus of claim 6, wherein the multi-source presentation comprises at least one of a video telephony presentation, a multiparty video conferencing presentation, a video surveillance presentation, and a training-like presentation.

8. The apparatus of claim 6, wherein the first indication comprises a signifier in a movie box for the file indicating at least one of sources and source information, and source-based mapping of media tracks in the file.

9. The apparatus of claim 6, wherein the apparatus is further directed to cause the first indication to be provided by including a source identifier in a track, and wherein the source identifier is indicative of a source from where media contained in the track was originated.

10. A method, comprising:
obtaining from a file a first indication indicating a plurality of tracks belonging to a multi-source presentation;
obtaining from the file a second indication related to how the plurality of tracks belonging to the multi-source presentation is to be rendered;
obtaining from the file at least one activity indicator, the at least one activity indicator indicating an activity level of a sample of one of the plurality of tracks; and
rendering the plurality of tracks belonging to the multi-source presentation based on the second indication and the at least one activity indicator;
wherein one or more of the plurality of tracks comprise video streams and further wherein the second indication comprises an indication of at least one split-screen window position specifying where to display the one or more video streams in a split-screen view, the at least one split-screen window position specifying horizontal and vertical coordinates of at least one split-screen window displaying the one or more video stream.

11. The method of claim 10, wherein the multi-source presentation comprises at least one of a video telephony presentation, a multiparty video conferencing presentation, a video surveillance presentation, and a training-like presentation.

12. The method of claim 10, wherein the first indication comprises a signifier in a movie box for the file indicating at least one of sources and source information, and source-based mapping of media tracks in the file.

13. The method of claim 10, wherein the first indication is indicative of a source from where media contained in the track was originated.

14. A computer-readable non-transitory storage medium having computer program code portions stored thereon, the computer program code portions being configured to, upon execution, cause an apparatus to perform the method of claim 10.

15. An apparatus comprising a processor and a memory storing program code, the memory and program code being configured to, with the processor, cause the apparatus to at least:
obtain from a file a first indication indicating a plurality of tracks belonging to a multi-source presentation;
obtain from the file a second indication related to how the plurality of tracks belonging to the multi-source presentation is to be rendered;
obtain from the file at least one activity indicator, the at least one activity indicator indicating an activity level of a sample of one of the plurality of tracks; and
render the plurality of tracks belonging to the multi-source presentation based on the second indication and the at least one activity indicator;
wherein one or more of the plurality of tracks comprise video streams and further wherein the second indication comprises an indication of at least one split-screen window position specifying where to display the one or more video streams in a split-screen view, the at least one split-screen window position specifying horizontal and vertical coordinates of at least one split-screen window displaying the one or more video stream.

16. The apparatus of claim 15, wherein the multi-source presentation comprises at least one of a video telephony presentation, a multiparty video conferencing presentation, a video surveillance presentation, and a training-like presentation.

17. The apparatus of claim 15, wherein the first indication comprises a signifier in a movie box for the file indicating at least one of sources and source information, and source-based mapping of media tracks in the file.

18. The apparatus of claim 15, wherein the first indication is indicative of a source from where media contained in the track was originated.

19. The method of claim 1, further comprising causing an indication of information regarding at least one party to be provided in the file.

20. The apparatus of claim 6, wherein the apparatus is further directed to cause an indication of information regarding at least one party to be provided in the file.

* * * * *